US012588592B2

(12) United States Patent
Missotten et al.

(10) Patent No.: US 12,588,592 B2
(45) Date of Patent: Mar. 31, 2026

(54) TRAINING METHOD FOR AN AGRICULTURAL VEHICLE AUTOMATION SYSTEM

(71) Applicant: CNH Industrial Belgium N.V., Zedelgem (BE)

(72) Inventors: Bart M. A. Missotten, Herent (BE); Pieter Maelegheer, Knokke-Heist (BE); Simon Van Campenhout, Grimbergen (BE); Bert Vandewalle, Torhout (BE); Arno Leenknegt, Hooglede (BE); Thomas Mahieu, West-Vleteren (BE)

(73) Assignee: CNH Industrial Belgium N.V., Zedelgem (BE)

( * ) Notice: Subject to any disclaimer, the term of this patent is extended or adjusted under 35 U.S.C. 154(b) by 124 days.

(21) Appl. No.: 18/432,757

(22) Filed: Feb. 5, 2024

(65) Prior Publication Data

US 2024/0260508 A1     Aug. 8, 2024

(30) Foreign Application Priority Data

Feb. 6, 2023     (EP) .................................... 23155229

(51) Int. Cl.
*A01D 41/127*     (2006.01)
*A01B 79/00*     (2006.01)
*A01B 79/02*     (2006.01)

(52) U.S. Cl.
CPC ........ *A01D 41/1275* (2013.01); *A01B 79/005* (2013.01); *A01B 79/02* (2013.01)

(58) Field of Classification Search
CPC .. A01D 41/1275; A01B 79/005; A01B 79/02; A01B 69/001; A01B 76/00
See application file for complete search history.

(56) References Cited

U.S. PATENT DOCUMENTS

2010/0287900 A1* 11/2010 Ringwald ............ A01D 41/141
                                                              56/28
2014/0215984 A1*  8/2014 Bischoff .............. A01B 79/005
                                                              56/10.2 R (Continued)

FOREIGN PATENT DOCUMENTS

CN     114303613 A     4/2022
DE       4431824 C1     5/1996

(Continued)

OTHER PUBLICATIONS

European Search Report Corresponding to EP23155229 on Jul. 14, 2023.

*Primary Examiner* — Frederick M Brushaber
(74) *Attorney, Agent, or Firm* — Dority & Manning, P.A.

(57)     ABSTRACT

An automation system is configured to automatically adjust an operational setting of an agricultural vehicle while performing an operation in a field in order to adjust an operational output parameter of the agricultural vehicle. A method of training the automation system comprises receiving operational information including at least a location of the agricultural vehicle and georeferenced field information. The method further comprises, based on the location of the agricultural vehicle and the georeferenced field information, deciding to run a training sequence. The training sequence comprises measuring the operational output parameter, changing the operational setting, monitoring a subsequent change of the operational output parameter, and updating the automation system based on the changing of the operational setting and the subsequent change of the operational parameter.

17 Claims, 2 Drawing Sheets

(56) References Cited

U.S. PATENT DOCUMENTS

2021/0015045 A1*  1/2021  Vandike ............... A01D 41/127
2021/0176916 A1*  6/2021  Sidon .................. G06F 18/2321

FOREIGN PATENT DOCUMENTS

EP          1321024 B1     5/2007
EP          3766331 A1     1/2021

* cited by examiner

TRAINING METHOD FOR AN AGRICULTURAL VEHICLE AUTOMATION SYSTEM

CROSS-REFERENCE TO RELATED APPLICATIONS

This application is based upon and claims the right of priority to European Patent Application No. EP23155229.0, filed Feb. 6, 2023, the contents of which are incorporated herein by reference in their entirety for all purposes.

TECHNICAL FIELD

The present invention relates to a method of training an automation system for an agricultural vehicle, the automation system being configured to automatically adjust an operational setting of the agricultural vehicle while performing an operation in a field in order to optimise an operational output parameter of the agricultural vehicle. The invention further relates to an automation system configure to execute this training method and an agricultural vehicle comprising such an automation system.

BACKGROUND

With the advancement of technology, agricultural vehicles have in recent decades increasingly been equipped with various kinds of automation systems. Most modern agricultural vehicles, such as tractors, combine harvesters, and forage harvesters are equipped with satellite based geolocation, 2D and/or 3D optical cameras, radar sensors, ultrasound sensors, and various types of other sensors for monitoring the operation of various parts of the agricultural vehicle and the field, obstacles, crop, or weather in its immediate surroundings. Fully and semi-automated control systems use and combine sensor input to adjust, e.g., the speed and trajectory of the agricultural vehicle, or operational settings of any of its functional parts.

The automation systems used in these agricultural vehicles may be programmed using theoretical models that prescribe optimal operational settings in dependence of specific sensor values or combinations of sensor values. More advanced automation systems may train their control algorithms using real world sensor data, often also referred to as control by artificial intelligence or AI in short, i.e. by changing an operational setting of a functional part of the agricultural vehicle, observing the subsequent change of one or more sensor values. The thus observed change may then be stored in a memory to later be used for predicting the effect a similar adjustment of the operational setting may have on the performance of the agricultural vehicle. While training the automation algorithms with real world data may lead to more accurate predictions and improved control over the field operation performed by the agricultural vehicle, it may not always be easy to reliably train the automation system. For example, unexpected changes in external factors influencing the operation of the agricultural vehicle may lead to skewed training data and unsatisfactory automation results.

It is an aim of the present invention to address one or more disadvantages associated with the prior art.

SUMMARY OF THE INVENTION

According to an aspect of the invention there is provided a method of training an automation system for an agricultural vehicle, the automation system being configured to automatically adjust an operational setting of the agricultural vehicle while performing an operation in a field in order to optimise an operational output parameter of the agricultural vehicle. The method comprises a step of receiving operational information including at least a location of the agricultural vehicle and georeferenced field information. The method further comprises a step based on the location of the agricultural vehicle and the georeferenced field information, deciding to run a training sequence. The training sequence comprises at least the steps of measuring the operational output parameter, changing the operational setting, monitoring a subsequent change of the operational output parameter, and updating the automation system based on the changing of the operational setting and the subsequent change of the operational output parameter.

With the method according to the invention, the training sequence is not just run whenever the user choses to do start one. Instead the decision on when to run a training sequence is made dependent on the location of the agricultural vehicle on the field, on the georeferenced field information, and possibly on some additional operational information relating to the current operational status of specific internal parts of the agricultural vehicle. Thus, the agricultural vehicle does not just take into account the position of the agricultural vehicle in the field, but also what internal and external factors influencing its operation it may be expected to run into during a planned or user-instructed training sequence. Based on such expected external factors, the automation system may decide whether it is, or is not, a good moment to start a training sequence. Alternatively, the automation system may plan in advance to start a training sequence when reaching a particular location in the field later. With this method according to the invention, by taking into account the stored georeferenced field data, it can be avoided that training sequences are started at locations in the field that are not suitable for doing so.

In preferred embodiments, of the method of training an automation system according to the invention, the step of deciding to run the training sequence may comprise the steps of:

based on the operational information, determining a stable training area that is suitable for running the training sequence on, determining a size of the stable training area in front of the agricultural vehicle, and deciding to run the training sequence in dependence of the size of the stable training area in front of the agricultural vehicle.

By only performing a training sequence in stable training areas and by assuring the stable training area is sufficiently large to complete the training sequence before reaching the end of it, it is ensured that the training system update will be based on reliable sensor data that is representative of future external conditions the agricultural vehicle will operate in and the expected effect these external conditions will have on the functioning of the agricultural vehicle. The decision to run a training sequence may be user-initiated, or triggered by the automation system itself. The latter may, e.g., be programmed to happen at a predetermined time interval after the previous training sequence, or when one or more performance indicators indicate a decline in performance or efficiency. In some embodiments, a training sequence may be started when a sufficiently large stable training area is entered and it is expected that, given the planned route for the agricultural vehicle, no further suitable training opportunity will be available soon.

When multiple different training sequences are available and may be run separately, the determined size of the stable training area may be enough for only some of the available training sequences. Similarly, different training sequences may require different levels of stability, or different types of stability. While for one training sequence, it may be important to have a stable field inclination, another training sequence may require a constant crop height.

The georeferenced field information used for deciding to run a training sequence may, e.g., include field properties, such as a predicted field inclination, a predicted field condition, or a distance to an end of the field. The georeferenced field information may further include crop properties, such as a predicted crop yield per unit area, a predicted crop density, a predicted crop height, a predicted crop moisture level or a predicted weed density and/or height. Less variation in field and crop properties makes a selected area more suitable for running a training sequence. A high weed density and/or height makes a selected area less suitable for running a training sequence as it might interfere unpredictably with the harvesting process. The georeferenced field information may, e.g., be obtained from external data providers, drones, satellite systems, or data gathered by sensors systems (optical camera, radar, ultrasound, etc.) mounted on the same or a different agricultural vehicle during a previous pass over the same field.

The determining of the size of the stable training area may comprise determining a predicted variance of an agricultural vehicle parameter, or of a field parameter, and adding the selected area to the stable training area if the predicted variance is below a predetermined threshold variance. The predicted variance is therein calculated to indicate how much the respective parameter is predicted to vary during a traversal of a selected area of the field by the agricultural vehicle while performing the operation.

Multiple separate variance values may be predicted for different parameters and each separate variance value may have its own respective threshold. The most suitable training areas will have below-threshold predicted variances for all relevant agricultural vehicle parameters and field parameters. However, the stability of some of those parameters may be considered more important than that of others, and the ultimate decision about an area's suitability for running a training sequence on may be based on some sort of weighted average of different predicted variances. Also, depending on the exact aim of the training sequence, different weights or thresholds may be applied to different predicted variances. When, e.g., testing the adjustment of a cleaning fan speed of a combine harvester, it may be important to have a stable field inclination. When testing the adjustment of a gap between a threshing rotor and a threshing cage, crop height and crop density may be more important.

The predicted variance may also be used to weigh the update of the automation system. For example, when the variance is large in a training sequence, a smaller weight, for example inversely proportional to the variance, can be given to the update of the automation system based on that training sequence and vice versa.

In an exemplary embodiment of the method according to the invention, the georeferenced field information includes the predicted crop yield per unit area, and the step of deciding to run the training sequence comprises determining a predicted grain tank filling level based on the predicted crop yield per unit area. The decision whether to run the training sequence may then be made in dependence of the predicted grain tank filling level. When the grain tank is completely filled, the necessary unloading of its content may seriously affect the possibility to run a useful and reliable training sequence. Similarly, when the control system knows, by any other means, that an unloading process will be started in a selected area, the respective area may be temporarily be declared unsuitable for starting a training sequence.

Optionally, the operational information further includes a current and/or predicted position of a second agricultural vehicle. For example, a predetermined travel plan or real time location information received from a nearby grain cart may inform the automation system of the combine harvester that an unloading process is to be started at a particular location in the field. For example, a predetermined travel plan or real time location information received from an approaching silage wagon may inform the automation system of the forage harvester that a change over in silage wagon is to be started at a particular location in the field.

According to a further aspect of the invention, an automation system is provided for an agricultural vehicle, the automation system being configured to automatically adjust an operational setting of the agricultural vehicle while performing an operation in a field in order to optimise an operational output parameter of the agricultural vehicle, wherein the automation system comprises a controller which is configured to execute the training methods as described above.

According to yet another aspect of the invention, an agricultural vehicle is provided comprising such an automation system. The agricultural vehicle may, e.g., be a tractor with or without an implement, a forage harvester, a combine harvester, or a tractor-baler combination. Alternatively, the automation system is at least partly provided remotely and configured for wireless communication with a controller of the agricultural vehicle.

BRIEF DESCRIPTION OF THE DRAWINGS

Embodiments of the invention will now be described by way of example with reference to the accompanying drawings, in which.

DETAILED DESCRIPTION

Figure 1:
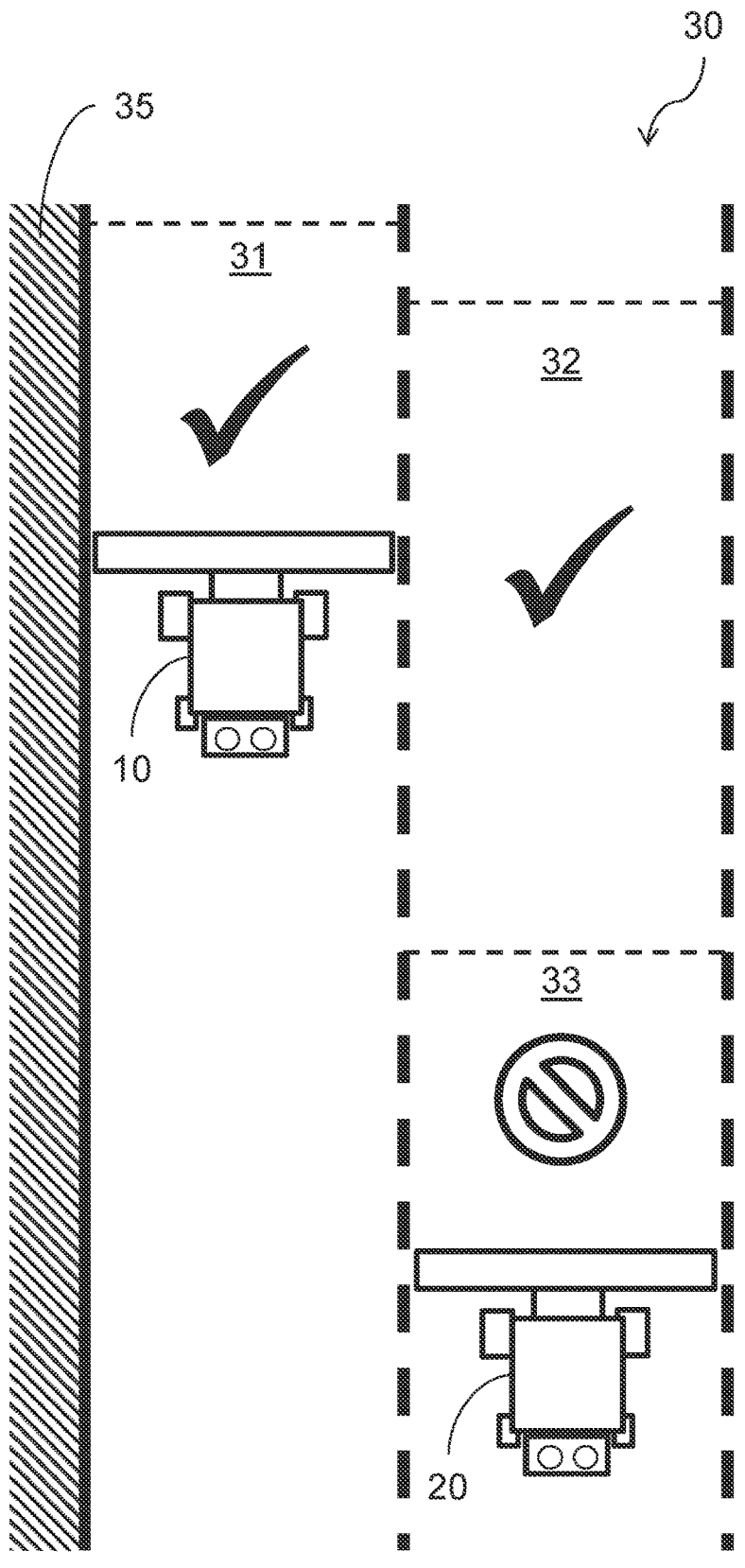
FIG. 1 schematically shows part of a field with two combine harvesters making use of the automation system according to the invention.

FIG. 1 schematically shows part of a field 30 with two combine harvesters 10, 20 making use of the automation system according to the invention. Although a schematic presentation like the one shown in this Figure may be displayed on a display screen of the agricultural harvester 10, 20 for allowing the user to make an informed decision about when to start a training sequence for the automation system, this Figure is mainly provided for purely illustrative purposes.

FIG. 1 shows an agricultural field 30 on which crops are or will be grown. A field border 35 indicates the edge of the field 30. Agricultural vehicles 10, 20, such as tractors, combine harvesters 10, 20, forage harvesters, or tractor-baler combinations traverse the field 30 while performing agricultural operations, such as tilling, seeding, spraying, mowing, or harvesting. In modern times, more and more of such agricultural operations are at least partly automated. The agricultural vehicle 10, 20 itself may be guided or moved around the field 30 by an autonomous driving system. Operational settings of functional parts of the agricultural vehicle 10, 20 may be fully or semi-automatically controlled while the agricultural vehicle 10, 20 drives over the field 30. For example, a header height, header reel position, threshing rotor speed, cleaning fan speed, or cleaning sieve opening may be automatically controlled in dependence of real time sensor data from a large variety of on-board sensors, nearby drones, or even remote satellite systems. The relevant sensor data measured by such sensors may, for example, relate to aspects of the field 30 and the crop on the field 30, weather conditions, including ambient temperature and/or humidity and wind, movement and fuel consumption of the agricultural vehicle 10, 20, the functioning of operational parts of the agricultural vehicle 10, 20, or parameters relating to the quantity and quality of any crops being harvested and processed by the agricultural vehicle 10, 20. Part of this relevant sensor data, e.g. fuel consumption and the quantity and quality of any crops being harvested may be operational output parameters the automation system aims to optimise by adjusting one or more operational settings of the agricultural vehicle 10, 20. Stored data, such as field and crop information or travel plans and predetermined instructions relating to the planned agricultural operation may be taken into account too by the automation system. Data can be in any form, like a certain value, a certain data array, like a time series or a multidimensional array, like an image or an image time series. Data can be processed in any known way, like filtering, smoothing, thresholding, averaging, etc.

The automation systems used in such agricultural vehicles 10, 20 may be programmed using theoretical models that prescribe optimal operational settings in dependence of specific sensor values or combinations of sensor values. More advanced automation systems may train their control algorithms using real world sensor data, i.e. by changing an operational setting of a functional part of the agricultural vehicle 10, 20, observing the subsequent change of one or more sensor values. The thus observed change may then be stored in a memory to later be used for predicting the effect a similar adjustment of the operational setting may have on the performance of the agricultural vehicle 10, 20. Training the automation algorithms with real world data brings the advantages of more accurate predictions and improved control over the field operation. However, the problem with real world data is that may be unpredictable and highly variable. To ensure that the obtained training data is representative of the normal and expected operation of the agricultural harvester 10, 20, it is preferred that those variables that are not deliberately varied during a training sequence are relatively stable and do not have too much (unknown) influence on the operational output parameters being monitored.

Figure 2:
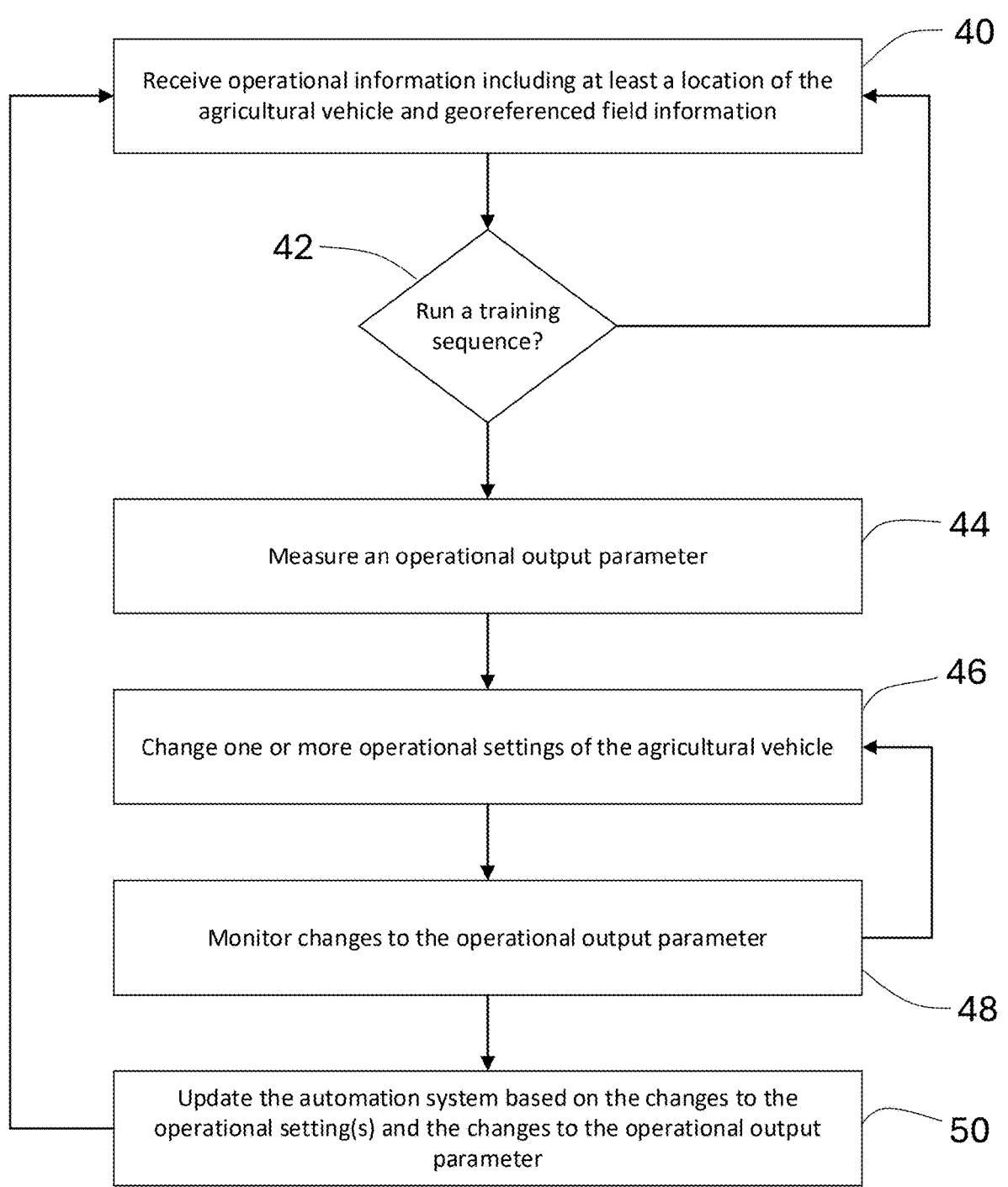
FIG. 2 provides a flow chart of an embodiment of a method according to the invention.

FIG. 2 provides a flow chart of an embodiment of a training method that is designed to further improve the performance of the automation systems of, for example, the combine harvesters 10, 20 of FIG. 1. The method starts with a first step 40 of receiving operational information including at least a location of the agricultural vehicle 10, 20 and georeferenced field information. This first step 40 of the training method may be performed continuously, periodically, or whenever the user of the automation system itself decides that it is time for training the automation system.

The georeferenced field information used for this training method may, e.g., include field properties, such as a predicted field inclination, a predicted field condition, or a distance to an end of the field 30. The georeferenced field information may further include crop properties, such as a predicted crop yield per unit area, a predicted crop density, a predicted crop height, a predicted crop moisture level or a predicted weed density and/or height. Less variation in field and crop properties makes a selected area more suitable for running a training sequence. A weed density and/or height exceeding a certain threshold may make a selected area less suitable for running a training sequence, as the weed might interfere with the cutting, transport, threshing and/or cleaning of the crop.

The georeferenced field information may, e.g., be obtained from external data providers, drones, satellite systems, or data gathered by sensors systems (optical camera, radar, ultrasound, etc.) mounted on the same or a different agricultural vehicle 10, 20 during a previous pass over the same field. For example, the georeferenced field information may be obtained by sensors on a sprayer or tractor, for later use by a combine harvester. The received georeferenced field information is stored in a memory of the automation system or easily obtainable from elsewhere on request. For example, the georeferenced field information may be stored by a different control system of the agricultural vehicle 10, 20 or remotely in a publicly or privately accessible data storage. The georeferenced field information may be stored in real time, while the agricultural vehicle 10, 20 drives over the field 30. For example, the agricultural vehicle may use cameras for observing parts of the field 30 that it will only drive on at a later point during the same agricultural operation. Even if georeferenced field information for that part of the field is already available and stored in the memory, the new sensor information may be used to confirm, supplement, or update the previously stored information.

In a special embodiment, pre-stored georeferenced field information relating to one part of the field 30 may be compared to corresponding sensor data obtained while driving on that part of the field 30. Based on this comparison, the system may be able to determine if and how the actual field data differs from the expected field data as stored in the memory. This information can then be used to predict how similar field data may differ from the stored data in other, upcoming parts of the same field 30.

The location of the agricultural vehicle 10, 20 will typically be determined and provided using a GPS sensor or similar global geolocation service. Alternatively, the agricultural vehicle 10, 20 may be equipped with a local positioning system that can determine the exact position of the agricultural vehicle 10, 20 in the field with high precision.

In a second step 42, the automation system decides whether or not to run a training sequence. Before starting a training sequence, either the user or the automation system itself needs to indicate that, at the current location of the agricultural vehicle 10, 20, there is a need for starting a particular training sequence. Additionally, the automation system needs to verify that the agricultural vehicle 10, 20 is at a location that is suitable for starting this training sequence. For example, when the automation system determines that the training sequence cannot be completed before reaching an end of the field 30, an upcoming steep decline, or an area with a lot of damaged crop, no training sequence may be started.

The decision to run a training sequence thus may be user-initiated, or triggered by the automation system itself. The latter may, e.g., be programmed to happen at a predetermined time interval after the previous training sequence, or when one or more performance indicators indicate a decline in performance or efficiency. In some embodiments, a training sequence may be started when a sufficiently large stable training area is entered. Additionally, the automation system might only start the training sequence when it is expected that, given the planned route for the agricultural vehicle, no further and/or better suitable training opportunity will be available.

To determine whether a particular selected area of the field 30 is suitable for starting a training sequence in, the automation system uses the received location of the agricultural vehicle 10, 20 and the georeferenced field information. Optionally, also some additional operational information is taken into account. For example, grain tank or fuel tank filling levels, or other signals indicating a current state of one or more internal parts of the agricultural vehicle 10, 20 may affect the readiness of the agricultural vehicle 10, 20 to start and successfully complete a new training sequence.

In preferred embodiments, of the method of training an automation system according to the invention, the step of deciding to run the training sequence may comprise determining a size of a stable training area in front of the agricultural vehicle 10, 20. One possible way to do this is to first, based on the operational information, determine a stable training area that is suitable for running the training sequence on. If a size of a stable training area in front of the agricultural vehicle is large enough to complete the full planned training sequence, the training sequence can be started at the third step 44 of the method shown in FIG. 2.

In FIG. 1, possible outcomes of the step 42 of determining whether or not to run a training sequence are shown. For a first selected area 31 and a second selected area 32, the automation system has determined that they are sufficiently stable to run a training sequence in. However, the first stable training area 31 is significantly smaller than the second stable training area 32 and the first combine harvester 10 may only start a training sequence if it can be finished before reaching the end of the first stable training area 31. Alternatively, a shorter version of the training sequence is selected to avoid running into an unstable area before the training sequence has been completed. The second combine harvester 20 is now driving over an unstable area 33, in which it is not possible to reliably and accurately train the automation system with new data. However, when this second combine harvester 20 reaches the second stable training area 32, a training sequence may be started.

The overview of stable training areas 31, 32 and unstable areas 33 as shown in FIG. 1 may relate to training sequences in general, or to one or more available specific training sequences. When multiple different training sequences are available and may be run separately, the determined size of the stable training area 31, 32 may be enough for only some of the available training sequences. Similarly, different training sequences may require different levels of stability, or different types of stability. While for one training sequence, it may be important to have a stable field inclination, another training sequence may require a constant crop height.

The determining of the size of the stable training area may comprise determining a predicted variance of an agricultural vehicle parameter, or of a field parameter, and adding the selected area to the stable training area if the predicted variance is below a predetermined threshold variance. The predicted variance is therein calculated to indicate how much the respective parameter is predicted to vary during a traversal of a selected area 31, 32, 33 of the field by the agricultural vehicle 10, 20 while performing the operation.

Multiple separate variance values may be predicted for different parameters and each separate variance value may have its own respective threshold. The most suitable training areas 31, 32 will have below-threshold predicted variances for all relevant agricultural vehicle parameters and field parameters. However, the stability of some of those parameters may be considered more important than that of others, and the ultimate decision about an area's suitability for running a training sequence on may be based on some sort of weighted average of different predicted variances. Also, depending on the exact aim of the training sequence, different weights or thresholds may be applied to different predicted variances. When, e.g., testing the adjustment of a cleaning fan speed of a combine harvester 10, 20, it may be important to have a stable field inclination. When testing the adjustment of a gap between a threshing rotor and a threshing cage, crop height and crop density may be more important.

In an exemplary embodiment of the method according to the invention, the georeferenced field information includes the predicted crop yield per unit area, and the step of deciding to run the training sequence comprises determining a predicted grain tank filling level based on the predicted crop yield per unit area. The decision whether to run the training sequence may then be made in dependence of the predicted grain tank filling level. When the grain tank is completely filled, the necessary unloading of its content may seriously affect the possibility to run a useful and reliable training sequence. Similarly, when the control system knows, by any other means, that an unloading process will be started in a selected area, the respective area may be temporarily declared unsuitable for starting a training sequence.

Optionally, the operational information further includes a current and/or predicted position of a second agricultural vehicle. For example, a predetermined travel plan or real time location information received from a nearby grain cart may inform the automation system of the agricultural vehicle that an unloading process is to be started at a particular location in the field.

When, in the second step 42, it is determined that no training sequence is to be initiated, the method returns to the first step of receiving the current location of the agricultural vehicle 10, 20 and, possibly, updated georeferenced field data and/or other operational parameters, such as sensor data indicating a current state of the internal operational parts of the agricultural vehicle 10, 20.

When, in the second step 42, it is determined that a training sequence is to be initiated, a training sequence will be started with a step 44 of measuring the operational output parameter that is to be optimised. Such operational output parameters may, for example, include, feed rate, fuel consumption, grain loss, broken grain, clean grain quality, straw quality, homogeneity and range of residue spreading. This initial measurement of the operation parameter can then later be used as a reference value for determining if any changes to the operational settings of the agricultural vehicle 10, 20 may improve its performance. This initial performance measurement is then followed by a step 46 of changing one or more operational settings of the agricultural vehicle 10, 20. While, or after, changing the operational settings of the agricultural vehicle, a subsequent step 48 of monitoring subsequent changes of the operational output parameter. The steps 46, 48 of changing the operational setting and measuring the immediate effect on the operational output parameter may be repeated multiple times to obtain more data points and allow the automation system to learn more about how the operational settings may influence the operational output parameters. In a final step 50, the automation system is updated based on the applied changes of the operational setting and the observed subsequent changes to the operational output parameters.

The invention claimed is:

1. A method of training an automation system for an agricultural vehicle, the method comprising:

receiving operational information including a fuel tank filling level and fuel consumption, and further including at least a location of the agricultural vehicle and georeferenced field information, and deciding to run a training sequence for the automation system while performing an agricultural operation in a field based on the location of the agricultural vehicle and the georeferenced field information;

wherein the training sequence comprises:

measuring an operational output parameter of the agricultural vehicle, changing an operational setting of the agricultural vehicle, actively controlling an operation of the agricultural vehicle based on the changing of the operational setting, monitoring a subsequent change of the operational output parameter, and updating the automation system based on the changing of the operational setting and the subsequent change of the operational output parameter; and wherein the deciding to run the training sequence comprises:

determining a predicted fuel tank filling level based on the fuel consumption, and deciding to run the training sequence based on the predicted fuel tank filling level.

2. The method of training then automation system as claimed in claim 1, wherein the deciding to run the training sequence comprises:

based on the operational information, determining a stable training area that is suitable for running the training sequence, determining a size of the stable training area in front of the agricultural vehicle, and deciding to run the training sequence based on the size of the stable training area in front of the agricultural vehicle.

3. The method of training the automation system as claimed in claim 2, wherein the determining the size of the stable training area comprises:

determining a predicted variance of an agricultural vehicle parameter, or of a field parameter, the predicted variance pertaining to a traversal of a selected area of the field by the agricultural vehicle while performing the agricultural operation, and adding the selected area to the stable training area if the predicted variance is below a predetermined threshold variance.

4. The method of training the automation system as claimed in claim 3, wherein the automation system is updated based on the changing of the operational setting and the subsequent change of the operational output parameter, weighed with a factor inversely proportional with the predicted variance.

5. The method of training the automation system as claimed in claim 1, wherein the georeferenced field information includes at least one of:

a predicted field inclination, a predicted field condition, or a distance to an end of the field.

6. The method of training the automation system as claimed in claim 1, wherein the georeferenced field information includes at least one of:

a predicted crop yield per unit area, a predicted crop density, a predicted crop height, a predicted crop moisture level, or a predicted weed density and/or height.

7. The method of training the automation system as claimed in claim 1, wherein the operational information further includes a current and/or predicted position of a second agricultural vehicle.

8. An automation system for an agricultural vehicles, the automation system comprising:

an agricultural vehicle that performs an agricultural operation within a field; and a controller that actively controls an operation of the agricultural vehicle during the performance of the agricultural operation, the controller:

receives operational information including a fuel tank filling level and fuel consumption, and further including at least a location of the agricultural vehicle and georeferenced field information, and decides to run a training sequence while performing the agricultural operation in the field based on the location of the agricultural vehicle and the georeferenced field information;

wherein the training sequence comprises:

measuring an operational output parameter of the agricultural vehicle, changing an operational setting of the agricultural vehicle, actively controlling the operation of the agricultural vehicle based on the changing of the operational setting, monitoring a subsequent change of the operational output parameter, and updating the automation system based on the changing of the operational setting and the subsequent change of the operational output parameter wherein the deciding to run the training sequence comprises:

determining a predicted fuel tank filling level based on the fuel consumption, and deciding to run the training sequence based on the predicted fuel tank filling level.

9. The automation system as claimed in claim 8 wherein the agricultural vehicle is a tractor, a combine harvester, a forage harvester, or a tractor-baler combination.

10. The automation system as claimed in claim 8, wherein, when deciding to run the training sequence, the controller:

based on the operational information, determines a stable training area that is suitable for running the training sequence, determines a size of the stable training area in front of the agricultural vehicle, and decides to run the training sequence based on the size of the stable training area in front of the agricultural vehicle.

11. The automation system as claimed in claim 10, wherein, when determining the size of the stable training area, the controller:

determines a predicted variance of an agricultural vehicle parameter or of a field parameter, the predicted variance pertaining to a traversal of a selected area of the field by the agricultural vehicle while performing the agricultural operation, and adds the selected area to the stable training area if the predicted variance is below a predetermined threshold variance.

12. The automation system as claimed in claim 11, wherein the controller updates the automation system based on the changing of the operational setting and the subsequent change of the operational output parameter, weighed with a factor inversely proportional with the predicted variance.

13. The automation system as claimed in claim 8, wherein the georeferenced field information includes at least one of:
  a predicted field inclination,
  a predicted field condition, or
  a distance to an end of the field.

14. The automation system as claimed in claim 8, wherein the georeferenced field information includes at least one of:
  a predicted crop yield per unit area,
  a predicted crop density,
  a predicted crop height,
  a predicted crop moisture level, or
  a predicted weed density and/or height.

15. The automation system as claimed in claim 14, wherein the georeferenced field information includes the predicted crop yield per unit area, and, when deciding to run the training sequence, the controller:
  determines a predicted grain tank filling level based on the predicted crop yield per unit area, and
  decides to run the training sequence based on the predicted grain tank filling level.

16. The automation system as claimed in claim 8, wherein the operational information further includes a current and/or predicted position of a second agricultural vehicle.

17. A method of training an automation system for an agricultural vehicle, the method comprising:
  receiving operational information including at least a location of the agricultural vehicle and georeferenced field information, the georeferenced field information including a predicted crop yield per unit area,
  determining a predicted grain tank filling level of the agricultural vehicle based on the predicted crop yield per unit area, and
  deciding to run a training sequence for the automation system while performing an agricultural operation in a field based on the location of the agricultural vehicle and the predicted grain tank filling level,
  wherein the training sequence comprises:
    measuring an operational output parameter of the agricultural vehicle,
    changing an operational setting of the agricultural vehicle,
    actively controlling an operation of the agricultural vehicle based on the changing of the operational setting,
    monitoring a subsequent change of the operational output parameter, and
    updating the automation system based on the changing of the operational setting and the subsequent change of the operational output parameter.

* * * * *